United States Patent [19]

Matsumoto et al.

[11] Patent Number: 5,288,850
[45] Date of Patent: Feb. 22, 1994

[54] PROCESS FOR REMOVING METALS FROM VINYLPHENOL POLYMERS

[75] Inventors: Tadashi Matsumoto, Omiya; Mitsuru Akaho, Kimitsu, both of Japan

[73] Assignee: Maruzen Petrochemical Co., Ltd., Tokyo, Japan

[21] Appl. No.: 980,310

[22] Filed: Nov. 23, 1992

[30] Foreign Application Priority Data

Nov. 28, 1991 [JP] Japan .................. 3-339727

[51] Int. Cl.$^5$ .............................. C08F 6/08
[52] U.S. Cl. .................. 528/482; 528/493; 528/494; 528/495
[58] Field of Search ............. 528/482, 493, 494, 495

[56] References Cited

U.S. PATENT DOCUMENTS

| | | | |
|---|---|---|---|
| 4,636,540 | 1/1987 | Warfel | 528/482 |
| 4,709,009 | 11/1987 | Fujiwara et al. | 528/486 |
| 4,985,540 | 1/1991 | Bradford et al. | 528/482 |

FOREIGN PATENT DOCUMENTS 0408363  1/1991  European Pat. Off. .

OTHER PUBLICATIONS

Derwent Publication re Japanese Patent Laid Open No. 63-154704.
Derwent Publication re Japanese Laid Open No. Hei 1 (1989) 103604.
Derwent Publication re Japanese Laid Open No. Sh 60 (1985) 58407.

*Primary Examiner*—Joseph L. Schofer
*Assistant Examiner*—Tom Weber
*Attorney, Agent, or Firm*—Melvin I. Stoltz

[57] ABSTRACT

The present invention provides an easily employed and economical process for removing substantially all of the metals from vinylphenol polymers by dissolving the vinylphenol polymer in a solvent and contacting the solution with a strong acidic cation exchange resin. In this way, vinylphenol polymers of high purity are attained, with a metal content which is virtually eliminated or substantially reduced.

14 Claims, No Drawings

PROCESS FOR REMOVING METALS FROM VINYLPHENOL POLYMERS

BACKGROUND OF THE INVENTION

1. Field of the Invention

The present invention relates to a process for removing metals such as, for example, sodium, potassium, calcium, iron, nickel, etc., from vinylphenol polymers, i.e., vinylphenol homopolymers, vinylphenol copolymers, modified polymers thereof, derivatives thereof, etc., by contacting a solution thereof with a strongly acidic cation exchange resin.

2. Description of the Prior Art

It is known that vinylphenol can be manufactured by dehydration of acetoxyphenylmethyl carbinol, decomposition of hydroxycinnamic acid by decarboxylation reaction, dehydrogenation of ethylphenol, or the like. It is also known that vinylphenol monomers manufactured by these processes can be polymerized or copolymerized in the presence of a cation or a radical polymerization initiator to produce vinylphenol-containing polymers (hereinafter referred to simply as vinylphenol polymers).

A number of products, processes for manufacturing thereof, and processes relating to the use of vinylphenol polymers are known in the art, including a process for producing a modified vinylphenol polymer product having a superior light transmittance by hydrotreating a vinylphenol polymer (Japanese patent Laid-open No. Hei 1 (1989)-103604, a process for producing a modified vinylphenol polymer product having excellent flexibility by a heat fusing reaction of a vinylphenol polymer or a mixture of a vinylphenol polymer and a novolak-type phenol resin (Japanese Patent Laid-open No. Sho 60 (1985)-58407, No. Sho 60 (1985)-81228), processes for manufacturing various ester or ether derivatives by the reaction of the hydroxy group of vinylphenol polymers, processes for the manufacture of various nuclear substituted derivatives of vinylphenol polymers, and the like.

These vinylphenol polymers generally contain metals such as sodium, iron, and the like originating from raw materials and auxiliary materials used in the manufacturing processes. Furthermore, it is very difficult to avoid contamination of vinylphenol polymers with metals during the manufacturing processes from materials from which the manufacturing apparatus is constructed, or from foul in the manufacturing apparatus as well as contaminants coming from the environment. Thus, contamination of vinylphenol polymers with metal impurities such as sodium and iron has been unavoidable according to conventional manufacturing processes of vinylphenol polymers. No process for removing these metal impurities has been known in the art heretofore.

SUMMARY OF THE INVENTION

Vinylphenol polymers are very useful materials as photoresists, C packaging materials, printed circuit boards, and the like. In order to cope with the recent miniaturization trend in these electronic devices requiring high precision and high electronic performances, metal contents in materials used therein must be minimized. Accordingly, when vinylphenol polymers are used in such electronic devices, reduction in contents of these metal impurities in vinylphenol polymers prepared by conventional processes to a minimum degree is strongly desired.

The object of the present invention is to provide a readily applicable and economical process for the removal of metals at a high degree of reduction from vinylphenol polymers.

As a result of extensive studies in order to achieve the above object, the present inventors have found that the above object can easily be achieved by dissolving a vinylphenol polymer into a solvent and contacting the solution with a strongly acidic cation exchange resin. This finding has led to the completion of the present invention.

Thus, the gist of the present invention resides in a process for removing metals from a vinylphenol polymer characterized by dissolving said vinylphenol polymer into a solvent to make a solution and contacting said solution with a strongly acidic cation exchange resin.

DETAILED DESCRIPTION OF THE INVENTION

The following vinylphenol polymers are given to which the process of the present invention can be applicable.

(a) Homopolymers of vinylphenol such as p-vinylphenol, m-vinylphenol, or the like. If desired, homopolymers may be those made from a monomer mixture of vinylphenol isomers, e.g., p- and m-isomers.

(b) Copolymers of vinylphenol and comonomers, e.g., styrene, acrylic acid, acrylic acid esters, methacrylic acid, methacrylic acid esters, maleic anhydride, maleic acid, maleic acid esters, maleimides, or the like, with the content of these comonomers being 70 mol % or less, preferably 50 mol % or less.

(c) Esterified or etherified delivertives of said vinylphenol polymers [a] or (b) in which the phenolic hydroxy groups of the vinylphenol polymers are partly or fully esterified with acetic acid, benzoic acid, or the like, or are partly or fully etherified with methanol, tert-butyl alcohol, trimethylsilyl alcohol, or the like.

(d) Vinylphenol polymers (a) or (b) having nuclear substituent. The substituent may be alkyl group, halogen, or methylol group, or the like.

(e) Modified vinylphenol polymers prepared by heat-fusion of vinylphenol polymers (a) or (b), or a mixture of vinylphenol polymers (a]or [b) with a novolak-type phenol resin.

(f) Modified vinylphenol polymers prepared by hydrotreatment of vinylphenol polymers (a) or (b).

The removal of metals from vinylphenol polymers according to the present invention comprises dissolving the vinylphenol polymer into a solvent to make a solution and contacting the solution with a strongly acidic cation exchange resin. As the solvents, solvents which are capable of dissolving vinylphenol polymers, stable without being deteriorated or decomposed when contacted with a strongly acidic cation exchange resin, and unreactive with vinylphenol polymers can be selected. Although depending on the types of vinylphenol polymers and the operation conditions, solvents satisfying these requirements include, but not limited to, alcohols, e.g., methanol, ethanol, isopropanol, etc.; esters, e.g., ethyl acetate, ethyl lactate, etc.; cyclic ethers, e.g., tetrahydrofuran, dioxane, etc.; ketones, e.g., acetone, methyl ethyl ketone, etc.; alkylene glycol ethers or esters, e.g., ethylene glycol ethyl ether, ethylene glycol ethyl ether acetate, ethylene glycol dimethyl ether, diethylene glycol dimethyl ether, propylene glycol monomethyl ether acetate, etc.; and the like.

These solvents are used for dissolving vinylphenol polymers generally in an amount to make the viscosity of the resulting solution 10 poise or less at the temperature at which it is contacted with the strongly acidic cation exchange resin. Lowering the viscosity of the solution by the use of a large amount of solvents can make the rate of metal removal higher. According to the studies of the present inventors, the viscosity of the solution less than about 1 poise can remove metals at a remarkably high level. Therefore, a preferable amout of solvents is the amount sufficient to make the viscosity of the solution 1 poise or less at the temperature at which it is contacted with the strongly acidic cation exchange resin. There are no specific limitations as to the larger side amounts of the solvents used, although the use of an excessive amount is not economical. Thus, the amount of the solvents to make the viscosity about 0.1 poise is generally and fully sufficient, and therefore, preferable viscosity range is between 0.1 and 1 poise.

Commercially available strongly acidic cation exchange resins can be used in the present invention. Among them, cation exchange resins of sulfonated styrene-divinylbenzene cross-linked polymer are preferred. There are two types of strongly acidic cation exchange resins, one is the porous type made of porous resins and the other one is the ge type which is made of nonporous resins. Surprisingly, the gel type can be used in the present invention as well as the porous-type. It is desirable to treat the strongly acidic cation exchange resin with an acid to sufficiently remove $Na^+$ and the like and increase the substituted amount of $H^+$ prior to use.

The batch agitation method and the fixed-bed flow method are applicable to the contact of vinylphenol polymers and the strongly acidic cation exchange resin, with the latter being more preferable.

The period of time required for the contact is usually in the range in terms of liquid hourly space velocity (LHSV) of 0.2–5 $hr^{-1}$ on the basis of the solution of the vinylphenol polymer, in the case of the fixed-bed flow method, even though there are no specific need that the range must be maintained. The temperature at which the materials are contacted is preferably 0°–100° C., and more preferably 10°–50° C. The rate of metal removal is lowered at a low temperature, since the solution of vinylphenol polymers has a high viscosity at low temperatures, requiring a large amount of solvent to reduce the viscosity to a suitable range. On the other hand, a higher temperature may impair qualities of the vinylphenol polymers or the solvent, may cause release of acids from the strongly acidic cation exchange resin, or may deteriorate the strongly acidic cation exchange resin, even though the low viscosity requirement for easy removal of metals is satisfied at a high temperature.

In a preferred embodiment, in order to seize anions contained in vinylphenol polymers or acids released from the strongly acidic cation exchange resin, anion exchange resins or chelating resins can be used together with the strongly acidic cation exchange resin. These anion exchange resins or chelating resins may be used as a mixed bed together with the strongly acidic cation exchange resin or as a two-bed system in which two types of resins are arranged in series.

Microfilters may be provided before and after the ion exchange resin treatment in order to remove by filtration insoluble impurities contained in the vinylphenol polymers or fine particles which might be flown out from the ion exchange resins. The strongly acidic cation exchange resin with a decreased metal-removing capability can be repeatedly used after regeneration by a washing treatment with solvents, water, acids, and the like.

The vinylphenol polymers from which metals have been removed by the process described above can be directed to various uses as a solution so called vanish. Alternatively, they can be purified by a process comprising precipitation of polymers produced by pouring the solution into purified water, collection of the precipitate by filtration, and drying the precipitate or a process comprising heat-treating the solution under vacuum to remove the solvent and drying the polymer.

Contents of various metal impurities, such as alkali metals, alkaline earth metals, and transition metals, e.g., sodium, potassium, calcium, iron, nickel, etc., contained in vinylphenol polymers can be reduced by the process of the present invention. In particular, when the process is applied at a viscosity of the solutions of 1 poise or less, all metal impurities can be reduced to a concentration of several ppb. The high purity products manufactured by the process of the present invention is suitably used as materials for precision devices, especially for electronic devices, such as photoresists, IC packaging materials, printed circuit boards, adhesives, and the like.

DESCRIPTION OF THE PREFERRED EMBODIMENTS

The present invention is hereinafter illustrated in more detail by way of examples, which are not intended to be limiting the present invention. In examples hereinbelow, proportions, parts and percentages are expressed by weight, unless otherwise indicated. Extinction coefficients in the examples are those measured on polymer solutions in ethanol at a concentration of $1.0 \times 10^{-4}$ g/ml by a spectrophotometer at a wavelength of 248 nm by using a cell with a length of 1 cm.

EXAMPLE 1

A hydrotreated modified poly-p-vinylphenol (extinction coefficient: 970 $cm^2$/g), prepared by hydrotreating poly-p-vinylphenol (weight average molecular weight: 5,000) at 190° C. under a hydrogen pressure of 70 Kg/$cm^2$ for 3 hours in the presence of a nickel catalyst according to the method disclosed in Japanese Patent Laid-open No. Hei 1 (1989)-103604 and containing 259 ppb of sodium, 150 ppb of iron, and 44 ppb of nickel, was dissolved into a mixed solvent of electronic grade (EL) methanol (10 parts) and EL isopropanol (90 parts) and filtered by a 1 μm filter to obtain a solution with a resin content of 33%. The solution had a viscosity of 1.4 poise at 25° C.

Sixty (60) ml of a commercially available high porous type strongly acidic cation exchange resin (RCP160H: Tradename, manufactured by Mitsubishi Kasei Corp., sulfonated styrene-divinylbenzene cross-liked polymer) was packed into an adsorption column made of glass with an internal diameter of 20 mm, treated with 1 liter of 3% hydrochloric acid, and washed with pure water until the effluent water showed pH 7. The adsorption column was installed in a clean bench provided with a class 100 air injection port and washed first with 500 ml of EL methanol and then with 500 ml of a mixed solvent of EL methanol (12 parts) and EL isopropanol (5 parts) fed via a micro-pump through a teflon tube.

Then, said solution cf the hydrotreated modified poly-p-vinylphenol was fed to the adsorption column by the micro-pump at a rate of LHSV of 0.2 $hr^{-1}$. After completely replacing inside of the adsorption column with said solution, the treated effluents were collected in a polyethylene container which had been washed with pure water and EL methanol in advance. The temperature in the clean bench was kept at 25° C., while the treated effluents were collected. The resin in the treated effluents had a sodium content of 25 ppb, iron content of 30 ppb, and nickel content of 29 ppb, all based on the resin contained in the treated solution of vinylphenol polymer (hereinafter the same).

Contents of each metal in the hydrotreated modified poly-p-vinylphenol and in the resin portion of the treated solution were measured by a frameless atomic absorption spectrophotometer.

EXAMPLES 2–4

The solution of hydrotreated modified poly-p-vinylphenol with a 33% resin content prepared in Example 1 was diluted with EL methanol at dilution rates different from the dilution rate of Example 1. The diluted solutions were passed through the strongly acidic cation exchange resin at 25° C. in the same manner as in Example 1. The results are shown in Table 1, in which the results of Example 1 are also shown together.

EXAMPLE 5

The solution of hydrotreated modified poly-p-vinylphenol with a 33% resin content prepared in Example 1 was passed through the strongly acidic cation exchange resin in the same manner as in Example 1, except that the temperature was 40° C. and the LHSV was 1.0 hr$^{-1}$. The results are shown in Table 1.

TABLE 1

| | Examples | | | | |
|---|---|---|---|---|---|
| | 1 | 2 | 3 | 4 | 5 |
| Concentration of solution (%) | 33 | 27 | 20 | 12 | 33 |
| Viscosity of solution (poise) | 1.4 | 0.5 | 0.25 | 0.15 | 0.7 |
| LHSV (hr$^{-1}$) | 0.2 | 1.5 | 1.2 | 1.2 | 1.0 |
| Temperature (°C.) | 25 | 25 | 25 | 25 | 40 |
| Metal content (ppb) | | | | | |
| Sodium | 25 | 8 | 6.5 | 4 | 10 |
| Iron | 30 | 5 | less than 0.5 | 4 | 5 |
| Nickel | 29 | less than 4 | less than 4 | — | — |

As can be seen from Table 1, when the viscosity of the treated solution is less than 1 poise, the content of each metal can be reduced to an extremely low level, i.e., to several ppb.

EXAMPLES 6 and 7

A similar hydrotreated modified poly-p-vinylphenol as that used in Example 1, but containing 263 ppb of sodium, 12 ppb of potassium, 136 ppb of iron and 60 ppb of nickel, and having an extinction coefficient of 990 cm$^2$/g, was dissolved into a mixed solvent of EL methanol (10 parts) and EL isopropanol (90 parts) to prepare a solution with a resin content of 33% and a viscosity of 1.4 poise at 25° C.

Sixty [60] ml of a commercially available gel type strongly acidic cation exchange resin (SKIB: Tradename, manufactured by Mitsubishi Kasei Corp., sulfonated styrenedivinylbenzene cross-liked polymer) was packed into an adsorption column made of glass with an internal diameter of 20 mm, treated with 5 liter of 3% hydrochloric acid, and washed with pure water until the effluent water showed pH 7. The solution of the above mentioned hydrotreated modified poly-p-vinylphenol was treated in the same manner as in Example 1 using this column, except that LHSV was 1.2 hr$^{-1}$. The results are shown in Table 2 as Example 6.

Furthermore, said solution of the hydrotreated modified poly-p-vinylphenol was diluted with EL methanol to a resin concentration of 13%, and treated in the same manner as above. The results are shown in Table 2 as Example 7.

TABLE 2

| | Example 6 | Example 7 |
|---|---|---|
| Concentration of solution (%) | 33 | 13 |
| Viscosity of solution (poise) | 1.4 | 0.15 |
| LHSV (hr$^{-1}$) | 1.2 | 1.2 |
| Temperature (°C.) | 25 | 25 |
| Metal content (ppb) | | |
| Sodium | 10 | less than 2.5 |
| Potassium | 2.5 | less than 2.5 |
| Iron | 41 | 8 |
| Nickel | 50 | less than 8 |

As can be seen from Table 2, Example 7 in which the viscosity of the solution was below 1 poise exhibited far superior results than Example 6 in which the viscosity was above 1 poise.

EXAMPLE 8

A poly-p-vinylphenol (weight average molecular weight: 5,000) was dissolved into diethylene glycol dimethyl ether to make a solution with a resin content of 33%. The solution had a viscosity of 0.45 poise at 25° C. n the same manner as in Example 1, the solution was passed through the high porous type strongly acidic cation exchange resin at 25° C. and at a rate of LHSV of 2.0 hr$^{-1}$.

In this experiment, prior to the treatment, the resin in said solution of poly-p-vinylphenol had a sodium content of 233 ppb and iron content of 30 ppb, whereas the resin in the solution after passing through the high porous type strongly acidic cation exchange resin contained only 3 ppb of sodium and 6 ppb of iron.

EXAMPLE 9

A copolymer of p-vinylphenol (55 mol %) and methyl methacrylate (45 mol %) (weight average molecular weight: 8,600) was dissolved into EL isopropanol to prepare a solution having a resin content of 15%. The solution had a viscosity of 0.55 poise at 25° C. In the same manner as in Example 1, the solution was passed through the high porous type strongly acidic cation exchange resin at 25° C. and at a rate of LHSV of 1.2 hr$^{-1}$.

In this experiment, prior to the treatment, the resin in said solution of the copolymer of p-vinylphenol and methyl methacrylate had a sodium content of 525 ppb and iron content of 112 ppb, whereas the resin in the solution after passing through the high porous type strongly acidic cation exchange resin contained only 8 ppb of sodium and 8 ppb of iron.

EXAMPLE 10

A copolymer of p-vinylphenol [70 mol %) and styrene [30 mol %) [weight average molecular weight: 1,400) was dissolved into etylene glycol monoethyl ether to prepare a solution having a resin content of 20%. The solution had a viscosity of 0.33 poise at 25° C. In the same manner as in Example 1, the solution was passed through the high porous type strongly acidic cation exchange resin at 25° C. and at a rate of LHSV of 1.2 hr$^{-1}$.

In this experiment, prior to the treatment, the resin in said solution of the copolymer of p-vinylphenol and styrene had a sodium content of 275 ppb and iron content of 151 ppb, whereas the resin in the solution after passing through the high porous type strongly acidic cation exchange resin contained only 4.5 ppb of sodium and 8 ppb of iron.

EXAMPLE 11

A brominated poly-p-vinylphenol (degree of bromination: 1.5 bromine atoms/aromatic nucleus, weight average molecular weight: 6,500) was dissolved into EL ethanol to prepare a solution having a resin content of 31%. The solution had a viscosity of 0.35 poise at 25° C. In the same manner as in Example 1, the solution was passed through the high porous type strongly acidic cation exchange resin at 25° C. and at a rate of LHSV of 1.2 hr$^{-1}$.

In this experiment, prior to the treatment, the resin in said solution of the brominated poly-p-vinylphenol had a sodium content of 312 ppb and iron content of 270 ppb, whereas the resin in the solution after passing through the high porous type strongly acidic cation exchange resin contained only 8 ppb of sodium and 10 ppb of iron.

EXAMPLE 12

A trimethylsilylated poly-p-vinylphenol (degree of silylation: 0.1 trimethylsilyl group/phenolic OH group, weight average molecular weight: 5,900) was dissolved into dioxane to prepare a solution having a resin content of 14%. The solution had a viscosity of 0.30 poise at 15° C. In the same manner as in Example 1, the solution was passed through the high porous type strongly acidic cation exchange resin at 15° C. and at a rate of LHSV of 1.5 hr$^{-1}$.

In this experiment, prior to the treatment, the resin in said solution of the trimethylsilylated poly-p-vinylphenol had a sodium content of 140 ppb and iron content of 95 ppb, whereas the resin in the solution after passing through the high porous type strongly acidic cation exchange resin contained only 6 ppb of sodium and 7 ppb of iron.

What is claimed is:

1. A process for removing alkali metals, alkaline earth metals, and transition metals from a vinylphenol polymer characterized by dissolving said vinylphenol polymer into a solvent to make a solution and contacting said solution with a strongly acidic cation exchange resin.

2. A process according to claim 1, wherein said solution of vinylphenol polymer has a viscosity of 1 poise or less at the temperature when said solution is contacted with said strongly acidic cation exchange resin.

3. A process according to claim 2, wherein said solution of vinylphenol polymer has a viscosity within a range of 0.1–1 poise.

4. A process according to claim 1, wherein said process is carried out by the use of a fixed bed flow method.

5. A process according to claim 4, wherein said process is carried out in a vinylphenol polymer charge rate expressed in the terms of liquid hourly space velocity of 0.2–5 hr$^{-1}$ on the basis of the solution of said vinylphenol polymer.

6. A process according to claim 1, wherein said process is carried out at a temperature within a range of 0°–100° C.

7. A process according to claim 1, wherein said solvent is selected from the group consisting of alcohols, esters, cyclic ethers, ketones, alkylene glycol ethers and alkylene glycol esters.

8. A process according to claim 1, wherein said process is carried out in coexistence of an anion exchange resin or a chelating resin.

9. A process according to claim 3, wherein said process is carried out by the use of a fixed bed flow method.

10. A process according to claim 9, wherein said process is carried out in a vinylphenol polymer charge rate expressed in the terms of liquid hourly space velocity of 0.2–5 hr$^{-1}$ on the basis of the solution of said vinylphenol polymer.

11. A process according to claim 10, wherein said process is carried out at a temperature within a range of 0°–100 C.

12. A process according to claim 11, wherein said solvent is selected from the group consisting of alcohols, esters, cyclic ethers, ketones, alkylene glycol ethers and alkylene glycol esters.

13. A process according to claim 12, wherein said process is carried out in coexistence of an anion exchange resin or a chelating resin.

14. A process according to claim 11, wherein said solvent is selected from the group consisting of alcohols, alkylene glycol ethers and cyclic ethers.

* * * * *